United States Patent
Hegmann et al.

(10) Patent No.: US 12,437,128 B2
(45) Date of Patent: Oct. 7, 2025

(54) DESIGNING, CONFIGURING AND MAINTAINING A DRIVE DEVICE

(71) Applicant: Siemens Aktiengesellschaft, Munich (DE)

(72) Inventors: Michael Hegmann, Schwabach (DE); Michael Leipold, Nuremberg (DE); Sven Ludwig Kellner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1192 days.

(21) Appl. No.: 17/280,608

(22) PCT Filed: Sep. 17, 2019

(86) PCT No.: PCT/EP2019/074789
§ 371 (c)(1),
(2) Date: Mar. 26, 2021

(87) PCT Pub. No.: WO2020/064412
PCT Pub. Date: Apr. 2, 2020

(65) Prior Publication Data
US 2022/0043945 A1 Feb. 10, 2022

(30) Foreign Application Priority Data
Sep. 28, 2018 (EP) .................................... 18197453

(51) Int. Cl.
*G06F 30/17* (2020.01)
*G06G 7/63* (2006.01)

(52) U.S. Cl.
CPC ............... *G06F 30/17* (2020.01); *G06G 7/63* (2013.01)

(58) Field of Classification Search
CPC .................................. G06F 30/17; G06G 7/63
USPC .............................................................. 703/1
See application file for complete search history.

(56) References Cited

U.S. PATENT DOCUMENTS

| 2006/0026672 A1 | 2/2006 | Braun |
| 2007/0288528 A1* | 12/2007 | Ebert ................. G06Q 10/0631 |
| 2009/0096405 A1* | 4/2009 | Flickinger ............ G01R 31/343 |
| | | 702/183 |

(Continued)

FOREIGN PATENT DOCUMENTS

| CN | 1737719 A | 2/2006 |
| CN | 1838671 A | 9/2006 |

(Continued)

OTHER PUBLICATIONS

Xu Jun et al; "Design of integrated-control system for plant numerical devices based on switched ethernet"; published: Aug. 25, 2008.

(Continued)

*Primary Examiner* — Andre Pierre Louis
(74) *Attorney, Agent, or Firm* — Henry M. Felereisen LLC

(57) ABSTRACT

A method for designing, configuring and maintaining a drive device with a central database provided for application programs used for designing, configuring and maintaining the drive device. Data are stored in the central database as temporal data and can be read and supplemented by the application programs. Configuration rules, dependent on the life cycle phase of the drive device, for an execution and/or an extent of a configuration change to the configuration of the drive device are defined.

14 Claims, 1 Drawing Sheet

(56) References Cited

U.S. PATENT DOCUMENTS

| | | |
|---|---|---|
| 2010/0014717 A1 | 1/2010 | Rosenkrantz |
| 2010/0106958 A1 | 4/2010 | Watanabe |
| 2011/0238935 A1 | 9/2011 | Meehan |
| 2012/0109830 A1 | 5/2012 | Vogel |
| 2014/0018976 A1 | 1/2014 | Goossen et al. |
| 2014/0056720 A1* | 2/2014 | Jackle .................... F04B 17/03 |
| | | 417/18 |
| 2014/0207726 A1 | 7/2014 | Blay et al. |
| 2015/0152856 A1* | 6/2015 | Kimura ................... F04B 49/06 |
| | | 62/55.5 |

FOREIGN PATENT DOCUMENTS

| | | |
|---|---|---|
| CN | 102099813 A | 6/2011 |
| CN | 102207951 A | 10/2011 |
| CN | 103616186 A | 3/2014 |
| CN | 104102857 A | 10/2014 |
| CN | 104249670 A | 12/2014 |
| DE | 102006021048 A1 | 11/2007 |

OTHER PUBLICATIONS

Chang Liu et al; "The software architecture design of measurement and control system in vacuum thermal tests"; published: Jun. 15, 2010.

PCT International Search Report and Written Opinion of International Searching Authority mailed Dec. 18, 2019 corresponding to PCT International Application No. PCT/EP2019/074789 filed Dec. 17, 2019.

* cited by examiner

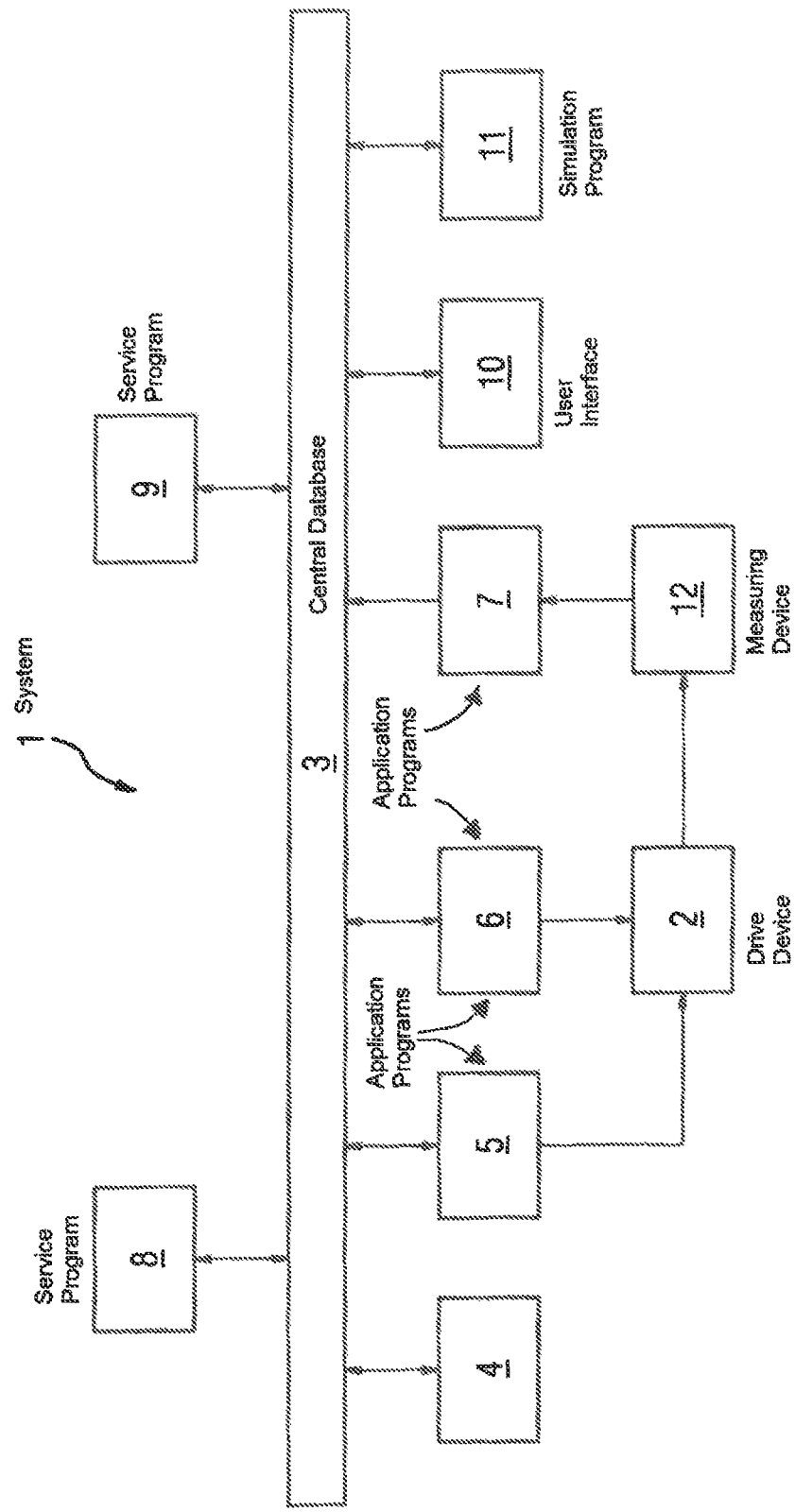

DESIGNING, CONFIGURING AND MAINTAINING A DRIVE DEVICE

CROSS-REFERENCES TO RELATED APPLICATIONS

This application is the U.S. National Stage of International Application No. PCT/EP2019/074789, filed Sep. 17, 2019, which designated the United States and has been published as International Publication No. WO 2020/064412 and which claims the priority of European Patent Application, Serial No. 18197453.6, filed Sep. 28, 2018, pursuant to 35 U.S.C. 119 (a)-(d).

BACKGROUND OF THE INVENTION

The invention relates to a method for designing, configuring and maintaining a drive device.

The life cycle of a drive device comprises various life cycle phases, for example regular operation with a current configuration of the drive device, maintenance measures for servicing, care and repair, configuration changes and commissioning of the drive device. Such life cycle phases can overlap and be repeated. For example, as a rule, servicing and care measures are usually executed repeatedly and repairs may be necessary several times. Configuration changes can also be made repeatedly. Here, a configuration change of a drive device is understood to mean a change in the parameterization and/or the components of the drive device. For example, a configuration change can be performed intentionally in order to adapt the drive device to changed requirements. However, a configuration change can also take place unintentionally, for example during a maintenance measure or as a result of a hacker attack. It may also be necessary for the drive device to be commissioned several times, for example in addition to the first commissioning, commissioning many be necessary after a configuration change or maintenance measure.

In a life cycle phase, information is frequently required about a previous life cycle phase. For example, after configuration changes it is often important to establish which parameters and/or components of the drive device have been changed from a previous configuration. Configuration changes can furthermore raise questions as to whether they might lead to a misconfiguration.

US 2014/207726 A1 discloses a system and a method for the maintenance of helicopter engines depending on the technical condition of the engines and the replacement of parts. Herein, data on operating conditions and operating condition indicators, modifications of the engines, servicing of the engines, servicing plans for the engines, causes of unscheduled events and configurations is stored in a centralized database.

US 2014/018976 A1 discloses a method for generating reports associated with an unmanned system that is controlled via a remote-control station. Herein, data relating to the unmanned system is transmitted to the remote-control station and the data is used in the remote-control station to generate a plurality of reports associated with the unmanned system.

The invention is based on the object of stipulating an improved method for designing, configuring and maintaining a drive device.

SUMMARY OF THE INVENTION

According to the invention, the object is achieved by a method as set forth hereinafter.

Advantageous embodiments of the invention are the subject matter of the subclaims.

With the method according to the invention for designing, configuring and maintaining a drive device, a central database is provided for application programs used for designing, configuring and maintaining the drive device, in which database the data is stored as temporal data and can be read and supplemented by the application programs. The drive device comprises, for example, an electric motor and a frequency converter driving the electric motor. Here, the configuration of a drive device includes a structure of the drive device consisting of specific components and/or a parameterization of the drive device. The maintenance of a drive device includes servicing, care and repair including a replacement of components.

Therefore, the invention provides for data required for designing, configuring and maintaining a drive device to be collected in a central database which application programs used for designing, configuring and maintaining the drive device can access in order to read and supplement data. As a result, the information required and generated by the individual application programs is managed centrally and does not need to be exchanged between the individual application programs. In particular, there is no need for error-prone and time-consuming management and synchronization of the data at different storage locations. The availability of all the data in the central database also means that commissioning of the drive device and downtimes in the event of malfunctions can be shortened, since such data does not have to be obtained from different sources or generated for the first time.

Due to the temporal retention of the data in the central database, the data is in each case stored with a time stamp indicating the time of storage without deleting or overwriting previously stored data. This enables the course of changes and maintenance measures performed on the drive device to be traced back. In particular, in the event of a misconfiguration of the drive device it is, for example, simpler to determine a cause of the misconfiguration and, if necessary, it is possible to resort to an older error-free configuration of the drive device, the data of which is filed in the central database.

One embodiment of the invention provides that data describing the designing of the drive device, data describing each implemented configuration of the drive device and data describing each maintenance measure performed on the drive device is stored in the central database. As a result, the central database enables the designing and all configurations and configuration changes of the drive device and all maintenance measures performed on the drive device to be documented in their chronological sequence.

A further embodiment of the invention provides that data describing the operation and operating conditions of the drive device are acquired and processed and the processed data is stored in the database. This enables the acquisition and use of important operating data for the drive device, for example in order to assess whether the configuration of the drive device is adapted to the operating data or should be changed and how the configuration should be changed if necessary. In particular, the configuration can be adapted to changed operating data, for example to a changed load or a changed ambient temperature of the drive device. In addition, malfunctions occurring during the operation of the drive device are easier to identify and rectify if necessary.

A further embodiment of the invention provides that data can be entered manually in the central database. This makes it possible, for example, for changes or maintenance measures performed manually on the drive device to be stored in the central database.

A further embodiment of the invention provides that the central database is provided on a server of an intranet or via a computer network in a data cloud. The provision of the central database on a server of an intranet can be advantageous if all programs and users accessing the central database have access to the intranet. The provision of the central database via a computer network in a data cloud can be advantageous if the access options to the central database are to be made more flexible.

A further embodiment of the invention provides that data that describes a current configuration of the drive device is in each case stored in the central database at predetermined times. This advantageously enables the current configuration of the drive device in each case to be retrieved via the central database as far as possible, even if, for example, the storage of data describing a configuration change in the central database was missed or failed.

The invention also provides that configuration rules for an execution and/or an extent of a configuration change to the configuration of the drive device are defined, with the configuration rules depending on a life cycle phase of the drive device. Preferably, it is furthermore monitored whether the configuration rules are complied with on a configuration change to the configuration of the drive device and a warning is generated if the configuration rules are not complied with. The definition of suitable configuration rules enables the execution of configuration changes to be organized and uncoordinated configuration changes, for example by different users and/or application programs, to be avoided. The dependence of the configuration rules on a life cycle phase of the drive device enables special requirements of the different life cycle phases to be taken into account. For example, during commissioning, it is possible to allow the deactivation of security specifications that have to be activated during the regular operation of the drive device. The issue of a warning on an infringement of the configuration rules can indicate a potential misconfiguration due to the infringement of the configuration rules and enable a misconfiguration to be prevented if necessary.

A further embodiment of the invention provides that typical configuration changes to a configuration of the drive device are determined and/or defined, that it is monitored whether a configuration change to the configuration of the drive device is a typical configuration change and that a warning is generated if a configuration change to the configuration of the drive device is not a typical configuration change. Atypical configuration changes can signal misconfigurations, for example including misconfigurations maliciously caused by hacker attacks. Therefore, if necessary, misconfigurations can be avoided by the detection of atypical configuration changes and the issue of a warning in the event of a detected atypical configuration change.

A further embodiment of the invention provides that a simulation program is provided from which the data stored in the database is read and used for a drive simulation of the drive device and the operation thereof. The drive simulation preferably enables simulation of a complete parameterization of the drive device and/or simulation of the behavior of the drive device in the event of faults. Furthermore, the simulation program can execute a machine simulation of a machine with the drive device and the drive simulation can be integrated in the machine simulation. An as realistic as possible drive simulation of the drive device and the operation thereof advantageously enables optimized designing and configuring of the drive device. The aforementioned embodiment of the invention enables a realistic drive simulation by the incorporation of data stored in the central database in the drive simulation. Integration of the drive simulation in a machine simulation of a machine with the drive device enables a particularly realistic simulation of the drive device and the operation thereof and is therefore particularly preferred.

BRIEF DESCRIPTION OF THE DRAWING

The above-described properties, features and advantages of this invention and the manner in which these are achieved will become clearer and more plainly comprehensible in conjunction with the following description of exemplary embodiments, which are explained in more detail in conjunction with the drawing. The single FIG. 1 shows a block diagram of a system for designing, configuring and maintaining a drive device 2.

DETAILED DESCRIPTION OF PREFERRED EMBODIMENTS

The system 1 comprises a central database 3, application programs 4 to 7 that access the database 3, service programs 8, 9, a user interface 10 and a simulation program 11.

The drive device 2 comprises, for example, an electric motor and a frequency converter driving the electric motor and optionally a transmission and a clutch.

The central database 3 is, for example, provided on a server of an intranet or via a computer network in a data cloud.

The central database 3 stores data describing a designing of the drive device 2, each implemented configuration of the drive device 2 and each maintenance measure performed on the drive device 2. Furthermore, the central database 3 stores data describing the operation and operating conditions of the drive device 2.

In the example depicted in the FIGURE, the data describing designing of the drive device 2 is generated by means of a first application program 4 and is written to the central database 3. This data in particular describes the dimensioning and layout of the drive device 2, for example the power and speed ranges of the electric motor.

The data describing configuring of the drive device 2 is generated by means of a second application program 5 and written to the central database 3. This data in particular describes a parameterization and the components of the drive device 2, for example including order numbers of these components.

Data describing maintenance measures performed on the drive device 2 is inter alia generated by means of a third application program 6 and is written to the central database 3. This data in particular describes servicing, care, replacement and repair measures executed automatically by the third application program 6 or using the third application program 6, for example in the form of protocol files (log files) describing the maintenance measures.

Users can access the central database 3 via the user interface 10 in order to read data stored in the central database 3 and/or to enter data manually in the central database 3. For this purpose, for example, access rights are issued that define which users are allowed to read and/or input data. For example, data describing the maintenance measures performed manually on the drive device 2 such as servicing, care, replacement and repair measures can be entered via the user interface 10.

The data describing the operation and operating conditions of the drive device 2 are generated by means of a fourth application program 7 and are written to the central database 3. This data describes, for example, a load and errors occurring during the operation of the drive device 2 and operating conditions such as temperature or atmospheric humidity. This data is generated from measured data acquired by a measuring device 12, supplied to the fourth application program 7 and processed by the fourth application program 7. The fourth application program 7 writes the processed measured data to the central database 3.

Furthermore, the simulation program 11 can access the data stored in the central database 3 in order to use the data for a drive simulation of the drive device 2 and the operation thereof. The drive simulation enables a simulation of a complete parameterization of the drive device 2, for example of the behavior of inputs and outputs, a setpoint channel, security functions, technology regulators, a single positioner for positioning a motor axis, a speed regulator of the electric motor, logic operations and a system integration (for example, communication with a controller) of the drive device 2. In particular, the drive simulation enables a simulation of the behavior the drive device 2 in the event of faults. The simulation program 11 is preferably embodied to execute a machine simulation of a machine with the drive device 2, with the drive simulation being integrated in the machine simulation. The integration of the drive simulation in the machine simulation can, for example, enable parts of the configuration of the drive device 2 (for example settings of regulating parameters) to be generated automatically as a result of the simulation and automatically further optimized. The simulation program 11 is for example performed on a personal computer.

The service programs 8, 9 enable a drive manufacturer of the drive device 2 to access the central database 3 in order to read and supplement data stored in the central database 3. For example, a first service program 8 enables the drive manufacturer to provide data for product release, product care and product handling (for example manuals) In the central database 3 and a second service program 9 enables initiation and documentation of a returns process, for example in order to replace components of the drive device 2.

The data is stored in the central database 3 as temporal data. In other words, the data is stored with a time stamp, which in each case indicates the time of the storage of the data, with previously stored data being neither deleted nor overwritten. Furthermore, the data can additionally be stored with an identifier of the program or user initiating the data storage in each case.

Furthermore, it can be provided that data describing a current configuration of the drive device 2 is stored in each case in the central database 3 at predetermined times, in particular at regular time intervals. This advantageously enables the current configuration of the drive device 2 in each case to be retrieved via the central database 3 as far as possible even if, for example, the storage of data describing a configuration change in the central database 3 was missed or failed. When storing a current configuration, it is, for example, possible to exclude parameters that are regularly changed (for example a regularly changed setpoint).

It can furthermore be provided that configuration rules for an execution and/or an extent of a configuration change to the configuration of the drive device 2 are defined. For example, at least one configuration restriction for a configuration of the drive device 2 can be defined in the database 3, for example by defining a value range for permissible values of the parameter for at least one configurable parameter of the drive device 2. Furthermore, the configuration rules can, for example, restrict simultaneous changing of different configuration parameters and/or establish a sequence of configuration changes in order to organize the execution of configuration changes and avoid uncoordinated configuration changes, for example by different users and/or application programs 4 to 6.

Furthermore, the configuration rules can be made dependent on a life cycle phase of the drive device 2. For example, during commissioning, it is possible to allow the deactivation of security specifications that have to be activated during the regular operation of the drive device 2.

Moreover, it is preferably monitored whether the configuration rules are complied with on a configuration change to the configuration of the drive device 2 and a warning is generated if the configuration rules are not complied with. The monitoring of compliance with the configuration rules and the generation of a warning can be implemented in the central database 3, i.e. performed by the central database 3.

Furthermore, typical configuration changes to the configuration of the drive device 2 can be determined and/or defined, and it is possible to monitor whether a configuration change to the configuration of the drive device 2 is a typical configuration change. If a configuration change to the configuration of the drive device 2 is not a typical configuration change, a warning can be generated. Typical configuration changes can, for example, be determined and/or defined by comparison with previous configuration changes, predetermined exemplary configurations and/or known standard configurations (for example of the same drive devices 2 in the same machines) and/or by a technical configuration analysis (for example including with the aid of self-learning mechanisms). The issue of a warning in the event of an atypical configuration change can indicate possible configuration errors, for example including due to hacker attacks. This monitoring of configuration changes and the issuing of warnings can also be implemented in the central database 3, i.e. performed by the central database 3.

In order to output warnings, the central database 3 has, for example, a notification interface via which the warnings are communicated to an operator of the drive device 2. Furthermore, the central database 3 can have a data interface to another database via which data can be exchanged with the other database, for example to retrieve exemplary or standard configurations of the same or similar drive devices 2. In addition, the central database 3 can store and manage data about a plurality of drive devices 2 of a machine and/or also drive devices 2 of different machines.

Although the invention was illustrated and described in more detail by preferred exemplary embodiments, the invention is not restricted by the disclosed examples and other variations can be derived herefrom by the person skilled in the art without departing from the scope of protection of the invention.

What is claimed is:

1. A method for designing, configuring, operating and maintaining a drive device, said method comprising:

acquiring, with a measuring device, measured data describing operation and operating conditions of the drive device;

generating with a first application program, data describing designing of the drive device;

generating with a second application program, data describing configuring of the drive device:

generating with a third application program, data describing maintaining of the drive device;

supplying the measured data to a fourth application program;

generating with the fourth application program data describing operation and operating conditions of the drive device by processing the measured data:

storing database data, as temporal data, the data generated by the first, second, third, and fourth application programs in a chronological sequence in a central database;

reading and supplementing the central database data by the first second third, and fourth application programs;

defining configuration rules, dependent on a life cycle phase of the drive device, for a configuration change to a configuration of the drive device;

defining typical configuration changes to the configuration of the drive device;

changing a configuration of the drive device according to at least one of the configuration rules;

monitoring whether the at least one of the configuration rules are complied with on the configuration change to the configuration of the drive device;

monitoring whether the configuration change to the configuration of the drive device is a typical configuration change; and generating a warning when the configuration rules are not complied with or the configuration change to the configuration of the drive device is not a typical configuration change indicating a potential misconfiguration and enabling the potential misconfiguration to be prevented.

2. The method of claim 1, wherein the drive device comprises an electric motor and a frequency converter driving the electric motor.

3. The method of claim 1, further comprising storing data describing dimensioning and layout of the drive device, and data describing a parameterization of the drive device, components of the drive device, each implemented configuration of the drive device, and each maintenance measure performed on the drive device in the central database.

4. The method of claim 1, further comprising entering data manually into the central database.

5. The method of claim 1, further comprising providing the central database on a server of an intranet or via a computer network in a data cloud.

6. The method of claim 1, further comprising storing data that describes a current configuration of the drive device in the central database at predetermined times.

7. The method of claim 1, further comprising:
reading the data stored in the central database with a simulation program; and
using the data stored in the central database with the simulation program for a drive simulation and operation of the drive device.

8. The method of claim 7, further comprising simulating with the drive simulation a complete parameterization of the drive device.

9. The method of claim 7, further comprising simulating with the drive simulation behavior of the drive device in an event of faults.

10. The method of claim 7, further comprising;
executing a machine simulation with the simulation program of a machine with the drive device; and
integrating the drive simulation in the machine simulation.

11. The method of claim 1, further comprising resorting to an older error-free configuration of the drive device, the data of which is stored in the central database, when the drive device has been misconfigured.

12. The method of claim 1, wherein the temporal data is stored in the central database with a time stamp indicating a time of storage without deleting or overwriting previously stored data and with an identifier of the application program or user initiating the data storage in each case.

13. The method of claim 1, wherein the defining configuration rules comprises defining at least one configuration restriction for a configuration of the drive device including at least one of defining a value range for permissible values of a parameter for at least one configurable parameter of the drive device, restricting simultaneous changing of different configuration parameters, and establishing a sequence of configuration changes in order to organize execution of configuration changes and to avoid uncoordinated configuration changes.

14. The method of claim 1, wherein the defining typical configuration changes comprises at least one of previous configuration changes, predetermined exemplary configurations, known standard configurations, and a technical configuration analysis.

* * * * *